(12) United States Patent
Yokoyama et al.

(10) Patent No.: US 6,483,949 B1
(45) Date of Patent: Nov. 19, 2002

(54) IMAGE PROCESSING APPARATUS AND METHOD, AND MEDIUM THEREFOR

(75) Inventors: Atsushi Yokoyama, Kanagawa; Yoko Miwa, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/365,049

(22) Filed: Jul. 30, 1999

(30) Foreign Application Priority Data

Aug. 6, 1998 (JP) .......................................... 10-222954

(51) Int. Cl.[7] .......................... G06K 9/64; H04N 15/00
(52) U.S. Cl. ...................... 382/278; 106/219; 106/154; 348/42; 348/48; 396/89
(58) Field of Search ................................ 382/106, 190, 382/219, 220, 278, 154, 276, 286, 293, 312; 396/89, 104, 121, 128; 348/42, 47, 48, 51, 139, 159, 169

(56) References Cited

U.S. PATENT DOCUMENTS 5,389,996 A * 2/1995 Oda et al. .................... 354/403
5,577,130 A * 11/1996 Wu .............................. 382/106
5,940,634 A * 8/1999 Nakamura .................... 396/104

\* cited by examiner

*Primary Examiner*—Leo Boudreau
*Assistant Examiner*—Kanji Patel
(74) *Attorney, Agent, or Firm*—Bell, Boyd & Lloyd LLC

(57) ABSTRACT

In order to measure a distance with high accuracy, a corresponding pixel extraction section reads a projection transformation matrix from a storage section, determines a reference pixel corresponding to a standard pixel, and outputs the pixel value thereof to a correlation value computation section. The correlation value computation section computes the mutual correlation value between a predetermined small area with the standard pixel being the center and a similar small area with the reference pixel being the center, as the sum of the squares of the difference of each pixel within the small area. A distance computation section extracts the point of the smallest value of an addition value input from the correlation value computation section and the points before and after it, creates a second-order curve passing through the three points, and outputs a distance corresponding to the smallest value of the second-order curve, as the distance of the standard pixel, to a distance image memory.

23 Claims, 13 Drawing Sheets

PRIOR ART

PRIOR ART

PRIOR ART

PRIOR ART

PRIOR ART

PRIOR ART

IMAGE PROCESSING APPARATUS AND METHOD, AND MEDIUM THEREFOR

BACKGROUND OF THE INVENTION

1. Field of the Invention

The present invention relates to an image processing apparatus and method, and to a medium therefor and, more particularly, relates to an image processing apparatus and method for measuring a distance to an object by using a plurality of stereo image pairs, and to a medium therefor.

2. Description of the Related Art

As shown in, for example, FIG. 1, a stereo image distance measurement system is known in which the same object 5 is photographed by a standard camera 1 and a reference camera 2, and in an image processing apparatus 31, corresponding pixels of a pair of photographed images (a standard image and a reference image A) are specified, and a distance from the standard camera 1 to the object 5 is determined by using parallax information.

The operation of this stereo image distance measurement system is described below. FIG. 2 shows the relationship between a reference image A and a standard image in which an object point P in a three-dimensional space is photographed by the standard camera 1 or the reference camera 2. That is, if a pixel corresponding to the object point P within the standard image is denoted as a pixel $m_b$, and a pixel corresponding to the object point P within the reference image A is denoted as a pixel $m_i$, the coordinates of the pixel $m_i$ are as described below by using a projection transformation matrix H of 3 rows and 3 columns:

$$m_i = H \cdot m_b$$

Therefore, the projection transformation matrix H can be computed if the coordinates of the pixels $m_b$ and $m_i$ are determined.

Accordingly, in a system in which the positional relationship between the standard camera 1 and the reference camera 2, and a distance Z from the standard camera 1 to the object point P are measured in advance, the coordinates of the pixels $m_b$ and $m_i$ are specified, and the projection transformation matrix H corresponding to the distance Z is computed in advance by using these coordinates. The computed projection transformation matrix H is stored in the image processing apparatus 31.

As shown in, for example, FIG. 1, when the distance from the standard camera 1 to the object point P is to be determined, the image processing apparatus 31, as shown in FIG. 3, assumes the distance to be $Z_1$ from among the distances $Z_1$ to $Z_n$ which are discretely set in a distance measurement range, and determines a reference image $m_{i1}$ by using the projection transformation matrix H, corresponding to the distance $Z_1$, in which the corresponding pixel (standard pixel) $m_b$ on the standard image is computed in advance and stored such that the object point P is photographed by the standard camera 1.

Thereafter, the image processing apparatus 31 computes the mutual correlation value $S_1$ between the determined reference image $m_{i1}$ and the standard pixel $m_b$. The mutual correlation value $S_1$ is computed by using the normalized mutual correlation between a predetermined small area with the pixel $m_b$ on the standard image being the center and a similar small area with the pixel $m_{i1}$ in the reference image A being the center, and an evaluation function, such as the sum of the squares of a luminance difference.

Next, assuming the distance from the standard camera 1 to the object point P to be $Z_2$, the image processing apparatus 31 determines a reference pixel $m_{i2}$ by using a projection transformation matrix H corresponding to the distance $Z_2$ which is computed in advance and stored. Thereafter, the image processing apparatus 31 computes a mutual correlation value $S_2$ between the determined pixel $m_{i2}$ and the pixel $m_b$.

Hereafter, in a similar manner, assuming a distance from the standard camera 1 to the object point P to be $Z_3$ to $Z_n$ in sequence, the image processing apparatus 31 determines the reference pixels $m_{i3}$ to $m_{in}$ by using a projection transformation matrix corresponding to the assumed distance and computes the mutual correlation values $S_3$ to $S_n$.

It is known that pixels $m_{i1}$ to $m_{in}$, in which the pixel $m_b$ on the standard image is projected within the reference image A, are present on one straight line called an "epipolar line", as shown in FIG. 3.

FIG. 4 shows the relationship between the distances $Z_1$ to $Z_n$ and the mutual correlation values $S_1$ to $S_n$. In the figure, it is shown that the smaller the value S of the mutual correlation value, the higher the correlation between pixels (the compared pixels are more similar).

Next, the image processing apparatus 31 creates a curve (for example, a second-order curve) passing through the smallest (highest correlation) one (a mutual correlation value $S_3$ in the example of FIG. 4) from among the mutual correlation values $S_1$ to $S_n$ and the values (the mutual correlation values $S_2$ and $S_4$ in the example of FIG. 4) before and after it, and outputs a distance $Z_e$ corresponding to the smallest value $S_e$ thereof as a distance of the standard pixel $m_b$.

FIG. 5 shows the construction of a stereo image distance measurement system which measures the distance from the standard camera 1 to the object 5 by using two sets of stereo image pairs (a standard image and a reference image A, and a standard image and a reference image B). For the operation thereof, a process similar to the construction shown in FIG. 1 is performed on two sets of stereo image pairs. That is, as shown in FIG. 6, an image processing apparatus 41 determines the pixels $m_{i1}$ to $m_{in}$ in the reference image A corresponding to the pixel $m_b$ on the standard image and computes the mutual correlation values $S_1$ to $S_n$ with respect to the pixel $m_b$. Also, the image processing apparatus 41 determines pixels $m_{i1}$ to $M_{in}$ on the reference image B corresponding to the pixel $m_b$ in the standard image, and computes the mutual correlation values $S_{1'}$ to $S_{n'}$ with respect to the pixel m$b$.

Thereafter, the image processing apparatus 41 adds together the mutual correlation values $S_1$ to $S_n$ and the corresponding mutual correlation values $S_{1'}$ to $S_{n'}$. FIG. 7 shows that the mutual correlation values $S_1$ to $S_n$ are indicated by ● marks, the mutual correlation values $S_1$ to $S_{n'}$ are indicated by ▲ marks, and the mutual correlation values $SS_1$ to $SS_n$ are indicated by □ marks.

Next, the image processing apparatus 41 selects the smallest (highest correlation) one (the addition value $SS_4$ in the example of FIG. 7) from among the addition values $SS_1$ to $SS_n$, and creates a curve (for example, a second-order curve) passing through the selected value and the values (the addition values $SS_3$ and $SS_5$ in the example of FIG. 7) before and after it, and outputs a distance $Z_e$ corresponding to the smallest value $SS_e$ as a distance of the standard pixel $m_b$.

In a manner as described above, use of two sets of stereo image pairs makes it possible to obtain a result with higher accuracy than when one set of stereo image pairs is used.

In the above-described stereo image distance measurement system, in order to determine the pixel on the standard image corresponding to the pixel $m_b$ on the standard image plane, a search is made (mutual correlation values are compared) discretely on the epipolar line. In order to measure a distance with a higher accuracy, it is preferable that a search be made on the epipolar line at shorter intervals.

However, on the epipolar line, if the number of searches is increased, the number of computations is increased correspondingly, resulting in problems in that the scale of the system is increased and the processing time is increased.

SUMMARY OF THE INVENTION

The present invention has been achieved in view of such circumstances. An object of the present invention is to make it possible to measure a distance with a higher accuracy without increasing the number of searches which must be performed.

To achieve the above-mentioned object, according to one aspect of the present invention, there is provided an image processing apparatus for measuring a distance to an object by using a plurality of images of the same photographed object, the image processing apparatus comprising: first extraction means for extracting, from a first reference image, a first candidate pixel which is a candidate for a first corresponding pixel corresponding to a desired pixel on a standard image, for each distance in a first group of distances formed of a plurality of distances which are set discretely in a measurement range; second extraction means for extracting, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range; computation means for measuring a similarity between the desired pixel on the standard image and the first candidate pixel on the first reference image, and a similarity between the desired pixel on the standard image and the second candidate pixel on the second reference image; and determination means for determining the distance to the object on the basis of the result computed by the computation means.

According to another aspect of the present invention, there is provided an image processing method for measuring a distance to an object by using a plurality of images of the same photographed object, the image processing method comprising: extracting, from a first reference image, a first candidate pixel which is a candidate for a first corresponding pixel corresponding to a desired pixel on a standard image, for each distance in a first group of distances formed of a plurality of distances which are set discretely in a measurement range; extracting, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range; measuring a similarity between the desired pixel on the standard image and the first candidate pixel on the first reference image, and a similarity between the desired pixel on the standard image and the second candidate pixel on the second reference image; and determining the distance to the object on the basis of the result computed by the computation means.

According to yet another aspect of the present invention, there is provided a medium for providing instructions to an image processing apparatus to execute a process for measuring a distance to an object by using a plurality of images of the same photographed object, the process comprising the steps of: extracting, from a first reference image, a first candidate pixel which is a candidate for a first corresponding pixel corresponding to a desired pixel on a standard image, for each distance in a first group of distances formed of a plurality of distances which are set discretely in a measurement range; extracting, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range; measuring a similarity between the desired pixel on the standard image and the first candidate pixel on the first reference image, and a similarity between the desired pixel on the standard image and the second candidate pixel on the second reference image; and determining the distance to the object on the basis of the result computed by the computation means.

In the image processing apparatus in accordance with the present invention, first extraction means extracts, from a first reference image, a first candidate pixel which is a candidate for a first corresponding pixel corresponding to a desired pixel on a standard image, for each distance in a first group of distances formed of a plurality of distances which are set discretely in a measurement range; second extraction means extracts, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range; computation means measures a similarity between the desired pixel on the standard image and the first candidate pixel on the first reference image, and a similarity between the desired pixel on the standard image and the second candidate pixel on the second reference image; and determination means determines the distance to the object on the basis of the result computed by the computation means.

In the image processing method and the medium therefor in accordance with the present invention, in the first extraction step, a first candidate pixel which is a candidate for a first corresponding pixel corresponding to a desired pixel on a standard image is extracted from a first reference image, for each distance in a first group of distances formed of a plurality of distances which are set discretely in a measurement range. In the second extraction step, a second candidate pixel which is a candidate for a second corresponding pixel corresponding to a desired pixel on the standard image is extracted from a second reference image, for each distance in a second group of distances formed of a plurality of distances, different from those of the first group of distances, which are set discretely in a measurement range. In the measurement step, a similarity is measured between the desired pixel on the standard image and the first candidate pixel on the first reference image, and a similarity is measured between the desired pixel on the standard image and the second candidate pixel on the second reference image. In the determination step, the distance to the object is determined on the basis of the result computed by the computation means.

The above and further objects, aspects and novel features of the invention will become more apparent from the following detailed description when read in connection with the accompanying drawings.

DESCRIPTION OF THE PREFERRED EMBODIMENT

Figure 8:
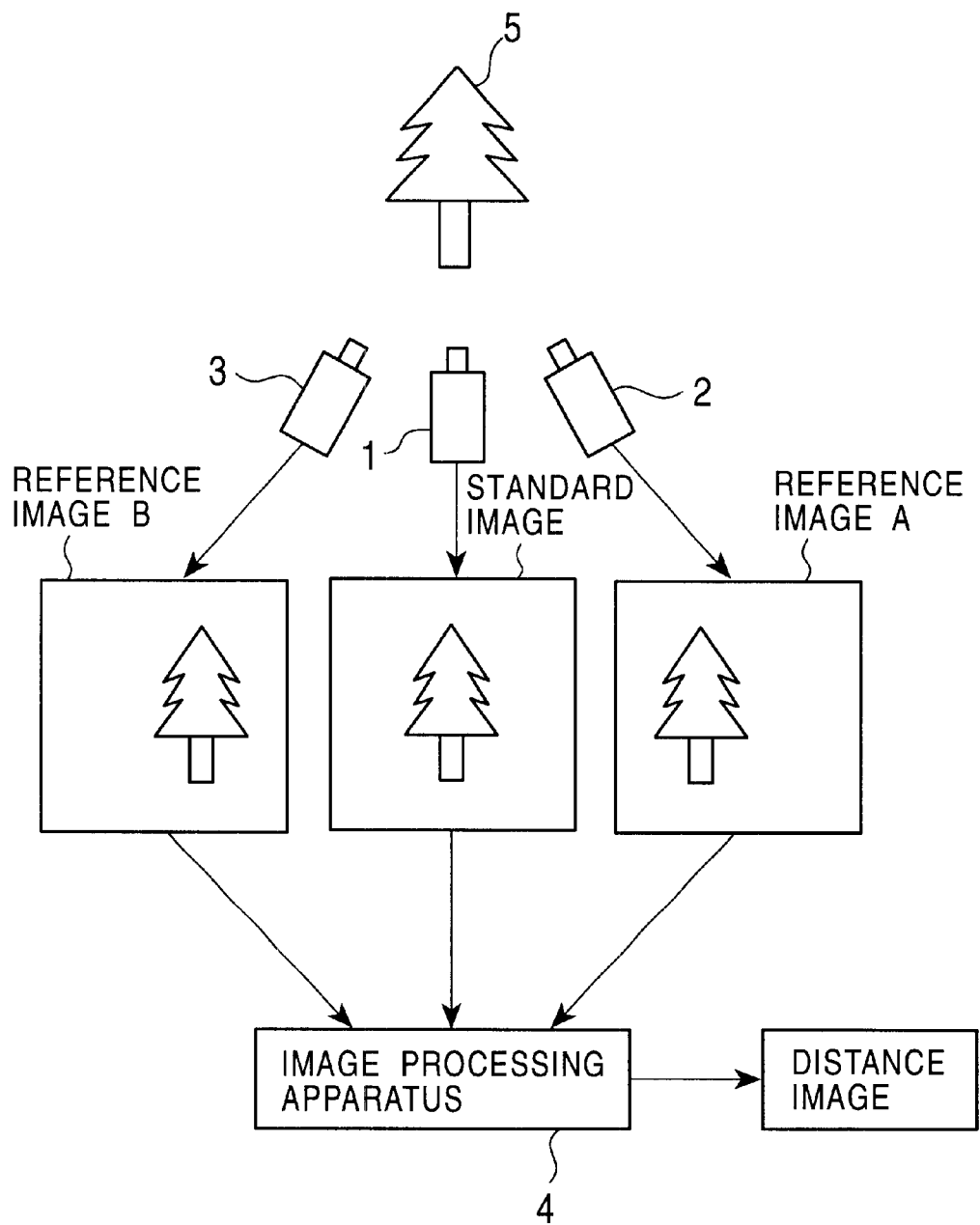
FIG. 8 shows the construction of a stereo image distance measurement system of the present invention.

A stereo image distance measurement system of the present invention is described below with reference to FIG. 8. In this specification, the terms used to describe the system refer to the overall apparatus formed of a plurality of apparatuses, means, etc.

A standard camera 1, and reference cameras 2 and 3, take a picture of an object 5 for which a distance is measured, and output the photographed image to an image processing apparatus 4. Here, it is assumed that an image photographed by the standard camera 1 is a standard image, an image photographed by the reference camera 2 is a reference image A, and an image photographed by the reference camera 3 is a reference image B.

The image processing apparatus 4 computes the distance of the object 5 from the standard camera by using input images and creates a distance image having information about the distance.

Figure 9:
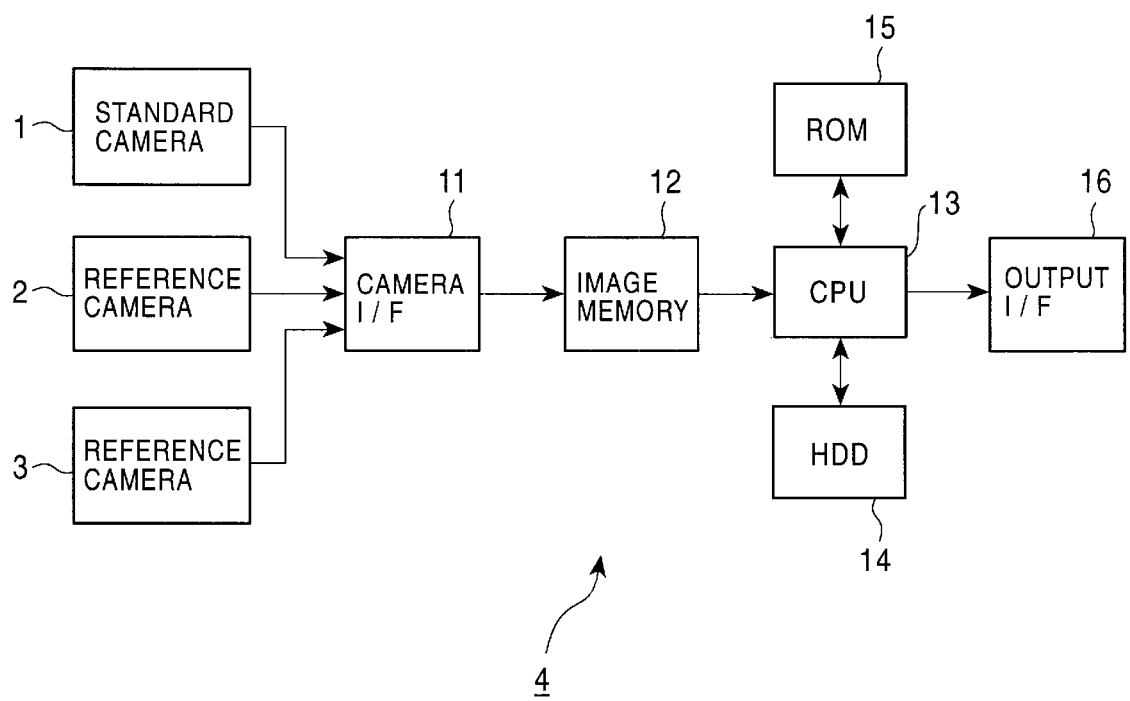
FIG. 9 is a block diagram showing the construction of an image processing apparatus 4 of FIG. 8.

FIG. 9 shows the construction of the image processing apparatus 4. The image information input from the standard camera 1 and the reference cameras 2 and 3 is converted to a digital signal by a camera interface (I/F) 11, and this signal is supplied to an image memory 12 and is stored therein. A CPU 13 reads required information, where appropriate, from the image memory 12 and a hard disk (HDD) 14 in order to create a distance image in accordance with control programs stored in a ROM 15, and outputs the distance image to an output interface (I/F) 15 to which is connected a display apparatus (not shown).

The hard disk 14 has stored therein a table in which projection transformation matrices H from a standard image to a reference image A or a reference image B are written; the projection transformation matrices H correspond to the distances which are discretely set within a measurement range. This table is prepared in advance by using experimental values.

Figure 10:
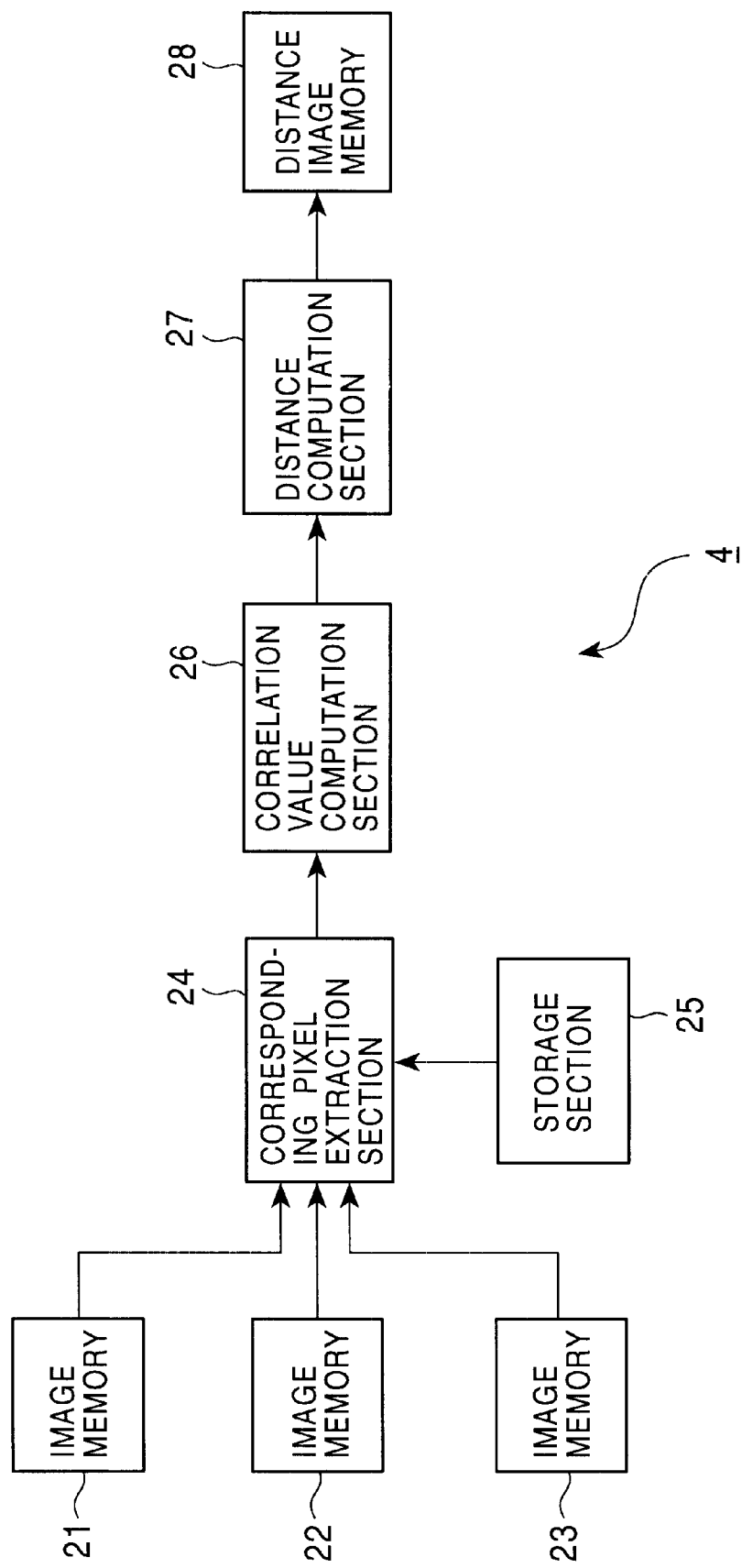
FIG. 10 is a block diagram showing the functional construction of the image processing apparatus 4.

FIG. 10 shows the functional construction of the image processing apparatus 4. Image memories 21 to 23 correspond to the image memory 12 of FIG. 9. The image memory 21 stores a standard image, the image memory 22 stores a reference image A, and the image memory 23 stores a reference image B.

Figure 11:
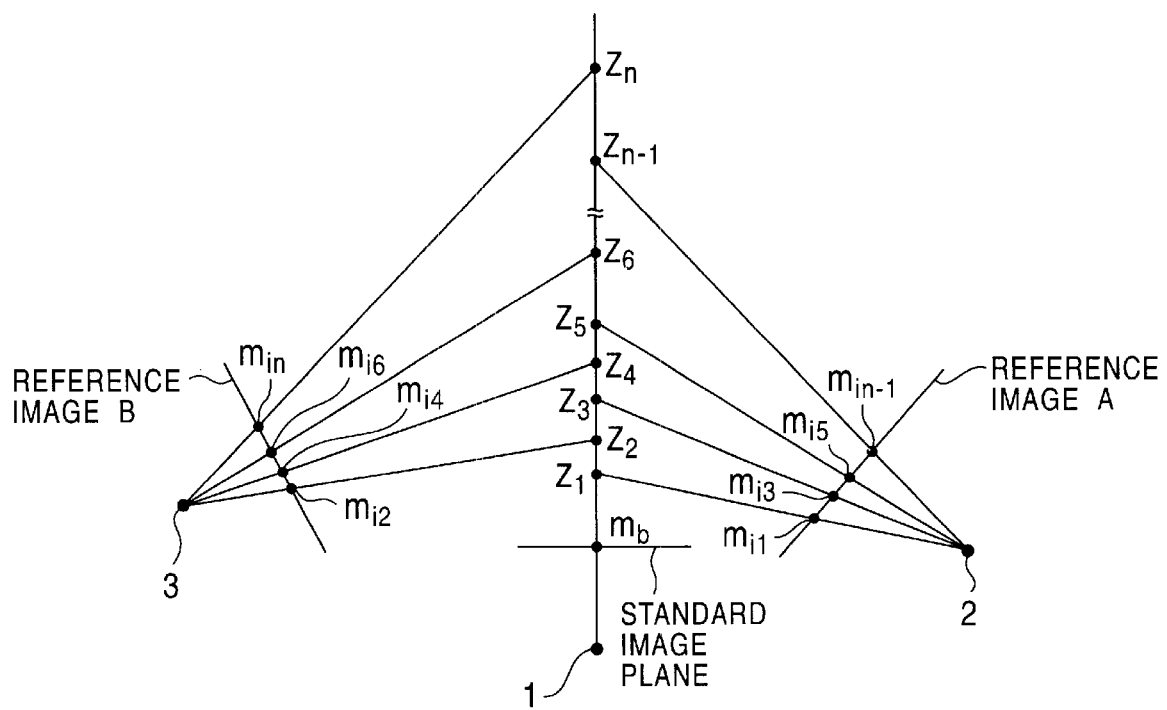
FIG. 11 is an illustration of the process of a corresponding pixel extraction section 24 of FIG. 10.

The corresponding pixel extraction section 24 reads the standard image from the image memory 21, reads the reference image A from the image memory 22, and further reads the projection transformation matrix H corresponding to each of the distances $Z_1, Z_3, \ldots, Z_{n-1}$ from a storage section 25 (corresponding to the HDD 14 of FIG. 9). As shown in FIG. 11, the corresponding pixel extraction section 24 then determines a plurality of reference pixels ($m_{i1}$, $m_{i3}, \ldots, m_{in-1}$) as candidates for the pixels in the reference image A corresponding to the pixel (standard pixel) $m_b$ on the standard image, and outputs the pixel values of the pixel $m_b$ and the a plurality of reference pixels ($m_{i1}, m_{i3}, \ldots, m_{in-1}$) to a correlation value computation section 26.

Furthermore, the corresponding pixel extraction section 24 reads the reference image B from the image memory 23, reads the projection transformation matrix H corresponding to each of the distances $Z_2, Z_4, \ldots, Z_n$ from the storage section 25, determines a plurality of reference pixels ($m_{i2}$, $m_{i4}, \ldots, m_{in}$) as candidates for pixels in the reference image B corresponding to the standard pixel $m_b$, and outputs the pixel values to the correlation value computation section 26.

The above-described distances $Z_1, Z_3, \ldots, Z_{n-1}$ are values which are set discretely within a measurement range, and the intervals are set in such a manner as to increase as the distance from the standard camera 1 increases. Also, the distances $Z_2, Z_4, \ldots, Z_n$ are values which are set at the middle of the respective distances $Z_1, Z_3, \ldots, Z_{n-1}$. These intervals may be set to be equal.

The correlation value computation section 26 computes mutual correlation values $S_1, S_3, \ldots, S_{n-1}$ (indicated by ▲ marks in FIG. 12) between a predetermined small area with the standard pixel $m_b$ being the center, and a similar small area with the reference pixels ($m_{i1}, m_{i3}, \ldots, m_{in-1}$) in the reference image A being the center, as the sum of the squares (SSD) of the difference of each pixel within the small area, as shown in, for example, the following equation:

$$SSD(x,y,\eta,\xi)=\Sigma(I(x+i, y+j)-J(x+i-, y+j-))^2$$

where 0<i<the size of the small area in the horizontal direction, 0<j<the size of the small area in the vertical direction, I (x, y) are the pixel values of the coordinate (x, y) within the standard pixel, J (x, y) are the pixel values of the coordinate (x, y) within the reference pixel, and ($\eta,\xi$) is the parallax.

The more similar the standard pixel $m_b$ is to the reference pixel, the smaller the mutual correlation value.

In a similar manner, the mutual correlation values $S_2$, $S_4, \ldots, S_n$ (indicated by ● marks in FIG. 12) between a predetermined small area with the standard pixel $m_b$ being the center and a similar small area with the reference pixels ($m_{i2}, m_{i4}, \ldots, m_{in}$) in the reference image B being the center are computed.

Furthermore, the correlation value computation section 26 creates, for example, a spline curve by using the computed mutual correlation values, and interpolates a mutual correlation value $S_{k+1'}$ of the mid-point of two adjacent mutual correlation values $S_k$ and $S_{k+2}$ (k=1, 2, ..., n-2) of the mutual correlation values. That is, the correlation value computation section 26 interpolates the mutual correlation values $S_2, S_4, \ldots, S_{n-2'}$ (indicated by ○ marks in FIG. 12) by using the mutual correlation values $S_1, S_3, \ldots, S_{n-1}$, and interpolates the mutual correlation values $S_3, S_5, \ldots, S_{n'}$ (indicated by marks in FIG. 12) by using the mutual correlation values $S_2, S_4, \ldots, S_n$.

In addition, the correlation value computation section 26 computes the addition value $SS_p = S_p + S_{p'}$ (p=2, 3, ..., n−1, indicated by □ marks in FIG. 12) of the mutual correlation values $S_2, S_3', S_4, \ldots, S_{n-1'}$ and the mutual correlation values $S_{2'}, S_3, S_{4'}, \ldots, S_{n-1}$, which correspond to each other, and outputs the addition value to a distance computation section 27.

Figure 1:
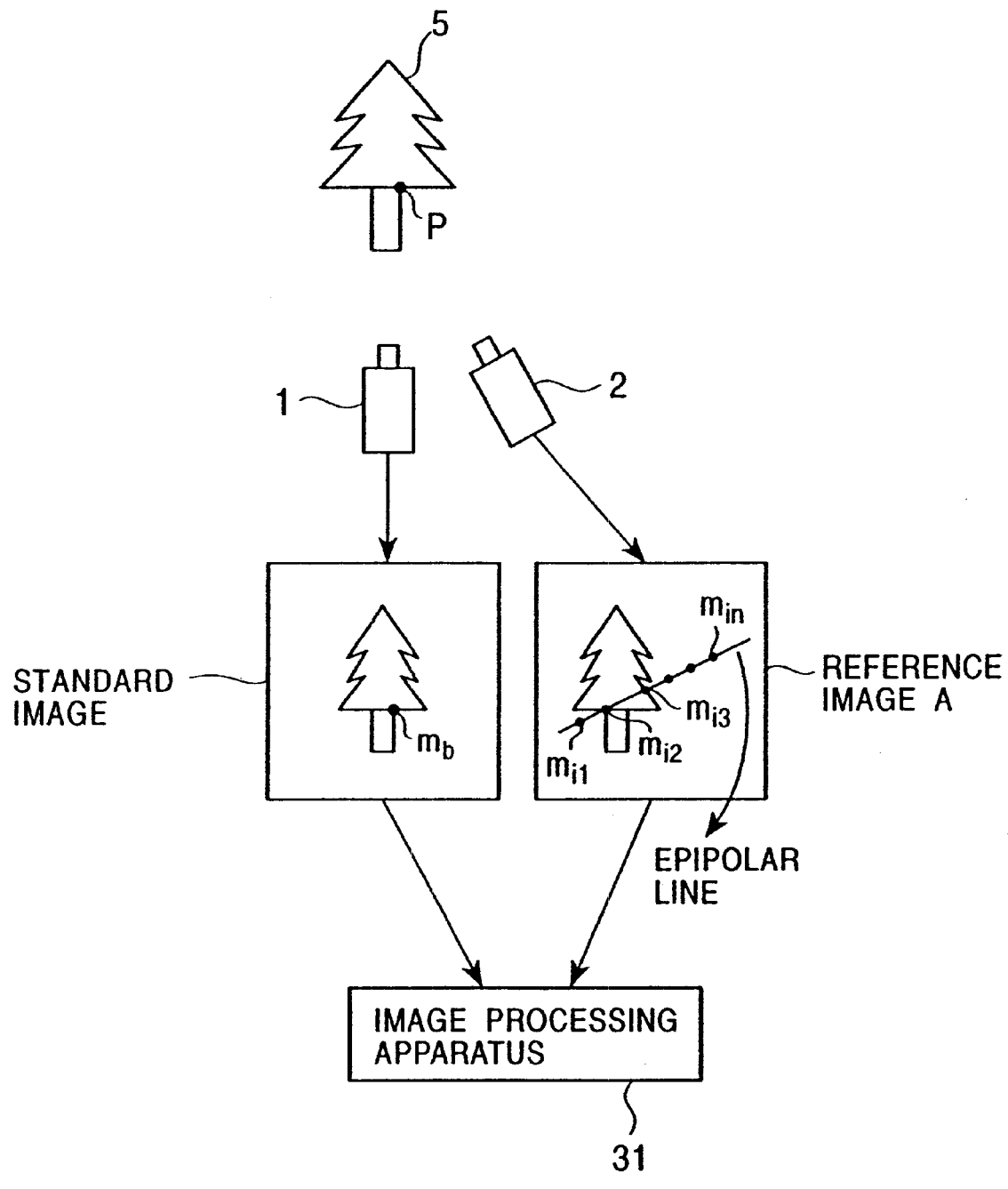
FIG. 1 shows the construction of a conventional stereo image distance measurement system.
Figure 2:
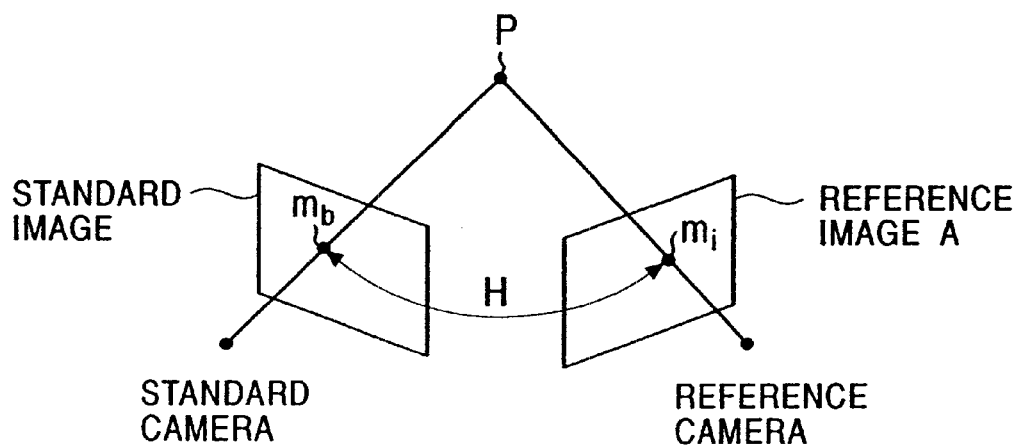
FIG. 2 is an illustration of a projection transformation matrix H.
Figure 3:
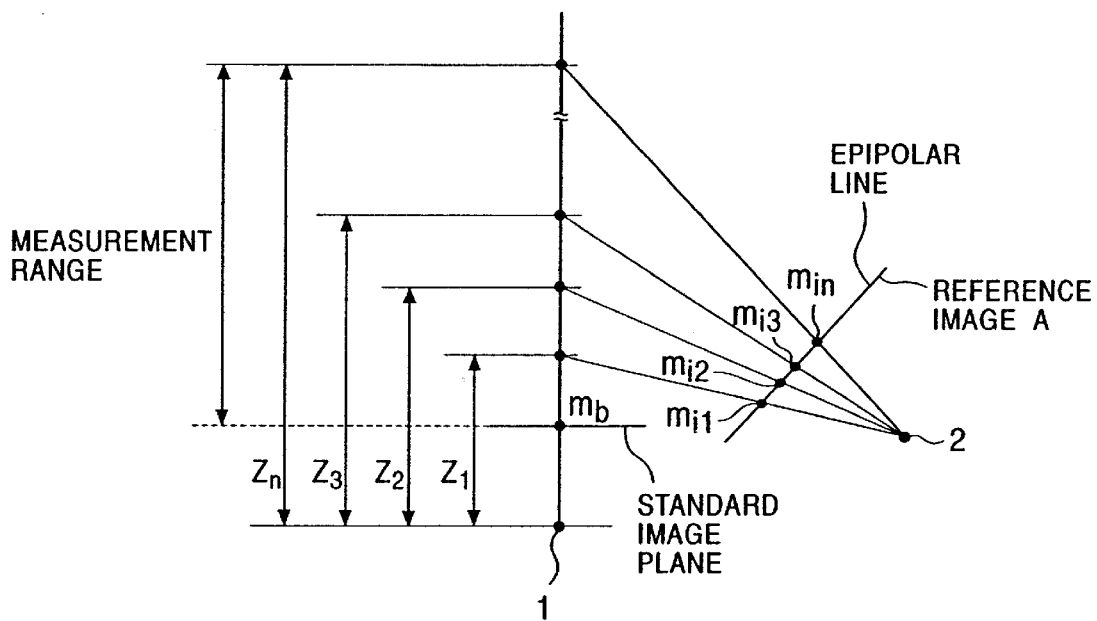
FIG. 3 is an illustration of the operation of the stereo image distance measurement system of FIG. 1.
Figure 4:
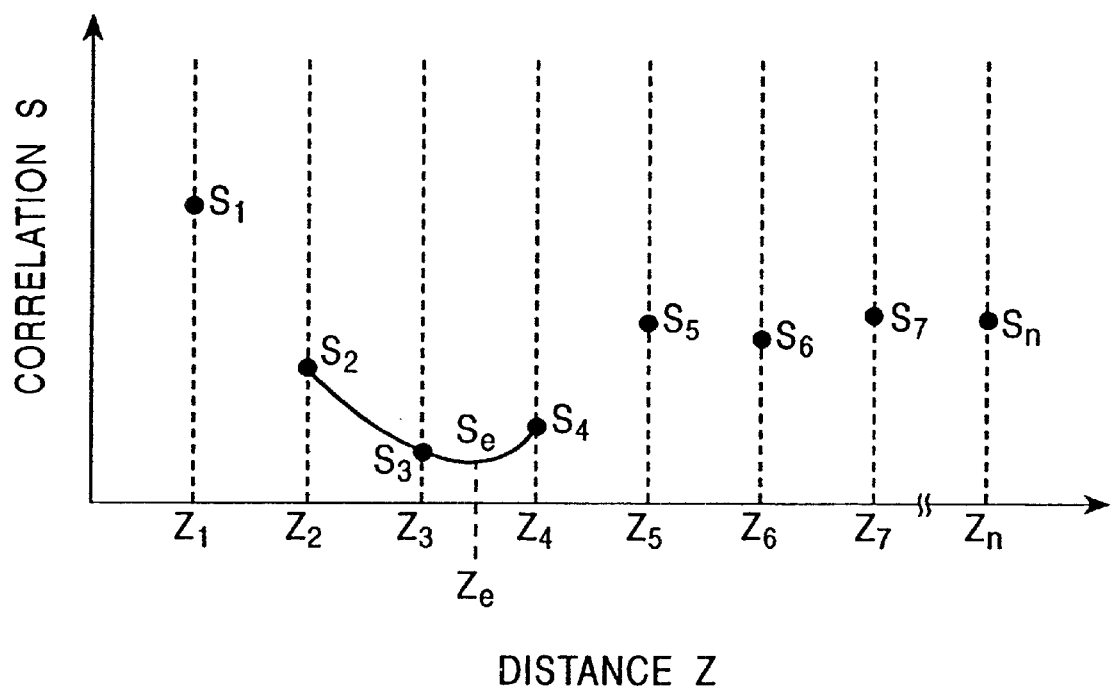
FIG. 4 is an illustration of the operation of the stereo image distance measurement system of FIG. 1.
Figure 5:
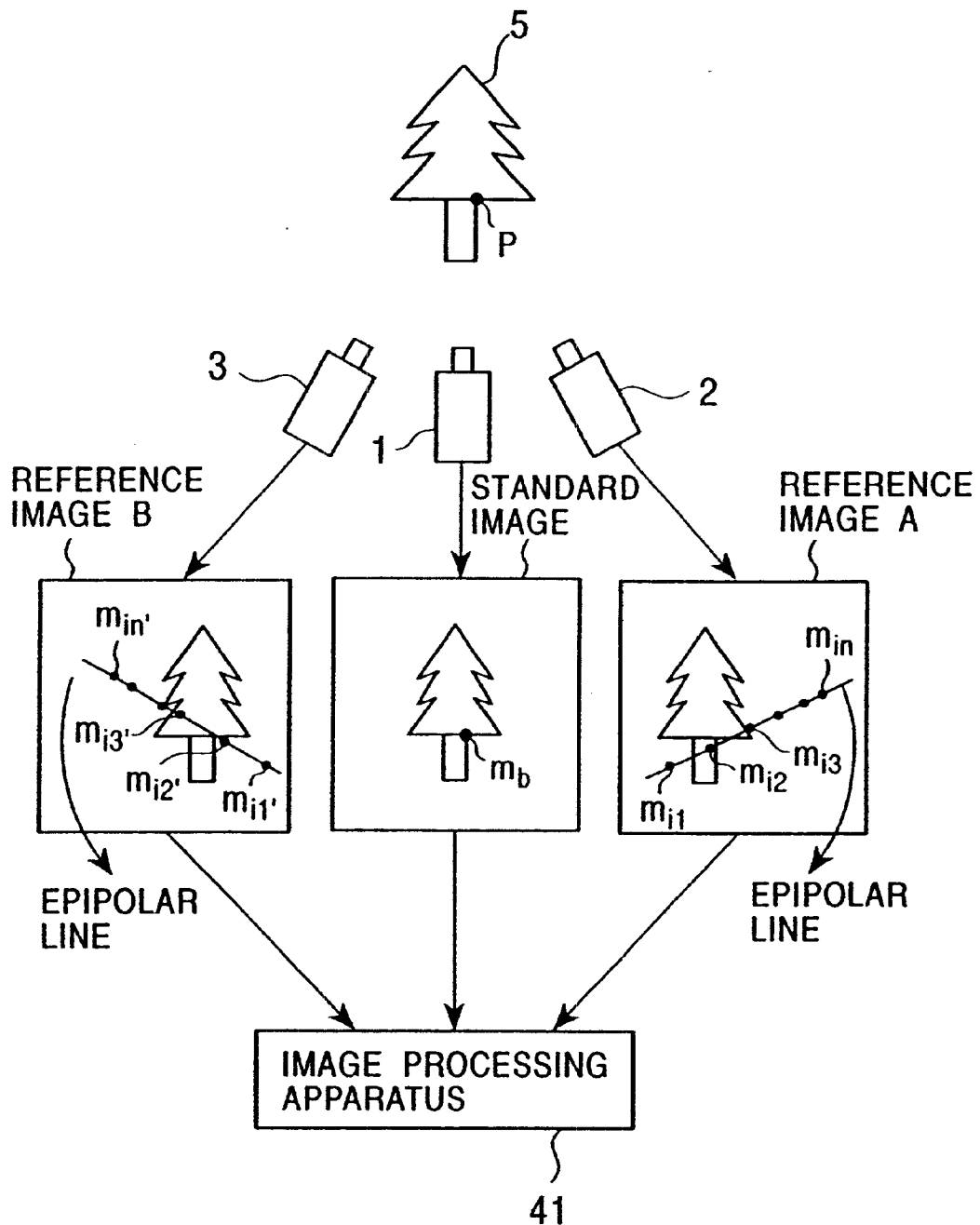
FIG. 5 shows another construction of a conventional stereo image distance measurement system.
Figure 6:
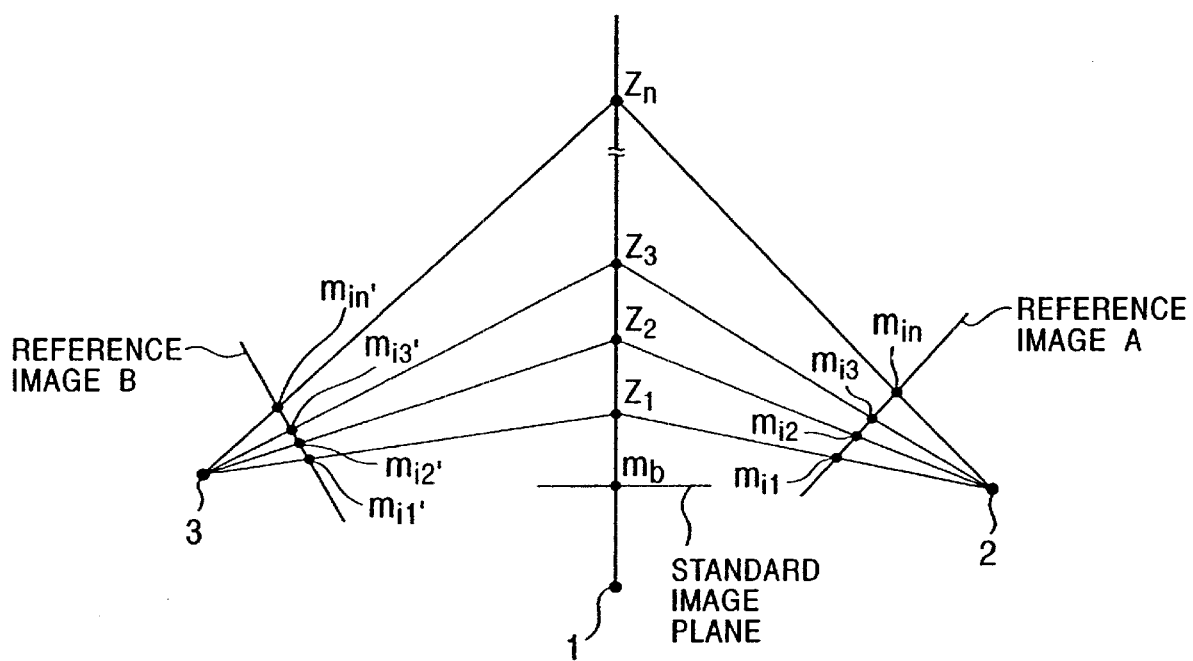
FIG. 6 is an illustration of the operation of the stereo image distance measurement system of FIG. 5.
Figure 7:
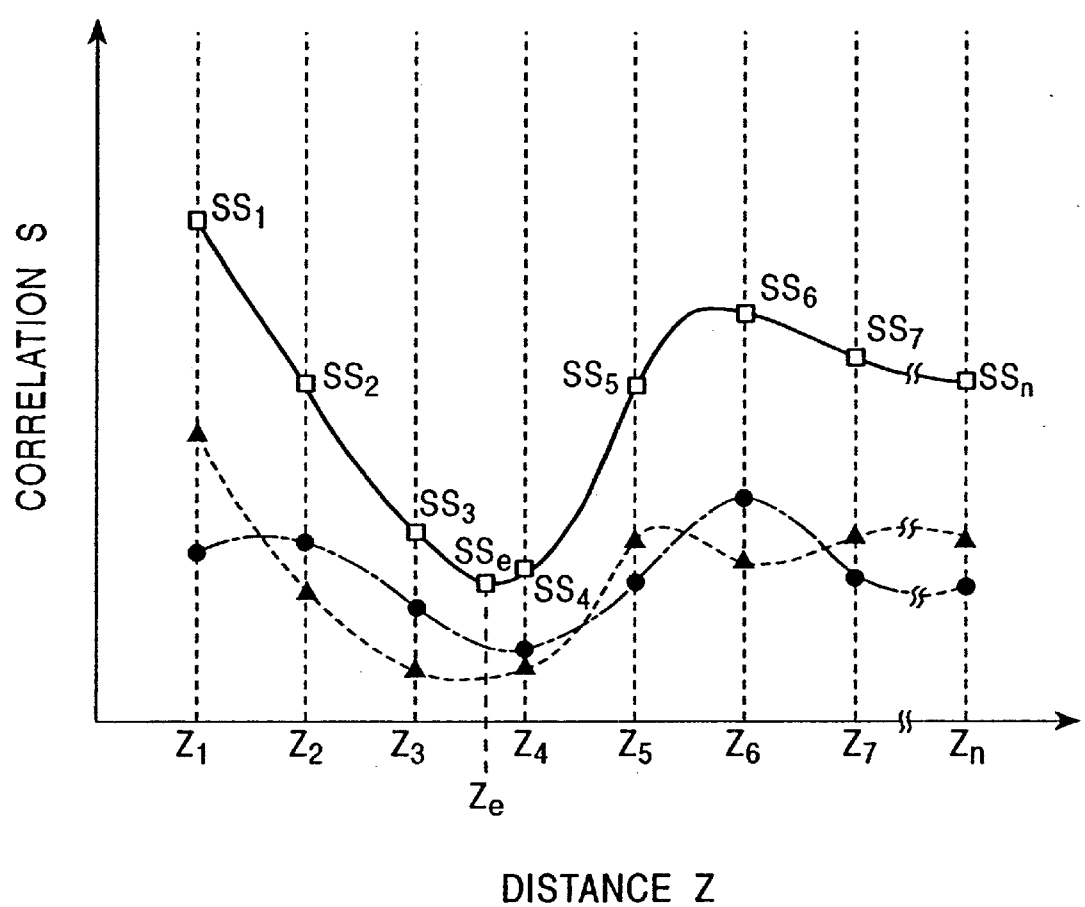
FIG. 7 is an illustration of the operation of the stereo image distance measurement system of FIG. 5.

The distance computation section 27 extracts the point (($Z_4, SS_4$) in the example of FIG. 5) of the smallest value of the addition value $SS_p$ input from the correlation value computation section 26, and the points ($Z_3, SS_3$) and ($Z_5, SS_5$) before and after it, creates a second-order curve passing through the three points, and outputs $Z_e$ corresponding to the smallest value of the second-order curve, as a distance of the standard pixel $m_b$, to a distance image memory 28.

The distance image memory 28 stores the coordinates of the standard pixel and the distance thereof in such a manner as to correspond to each other.

Figure 13:
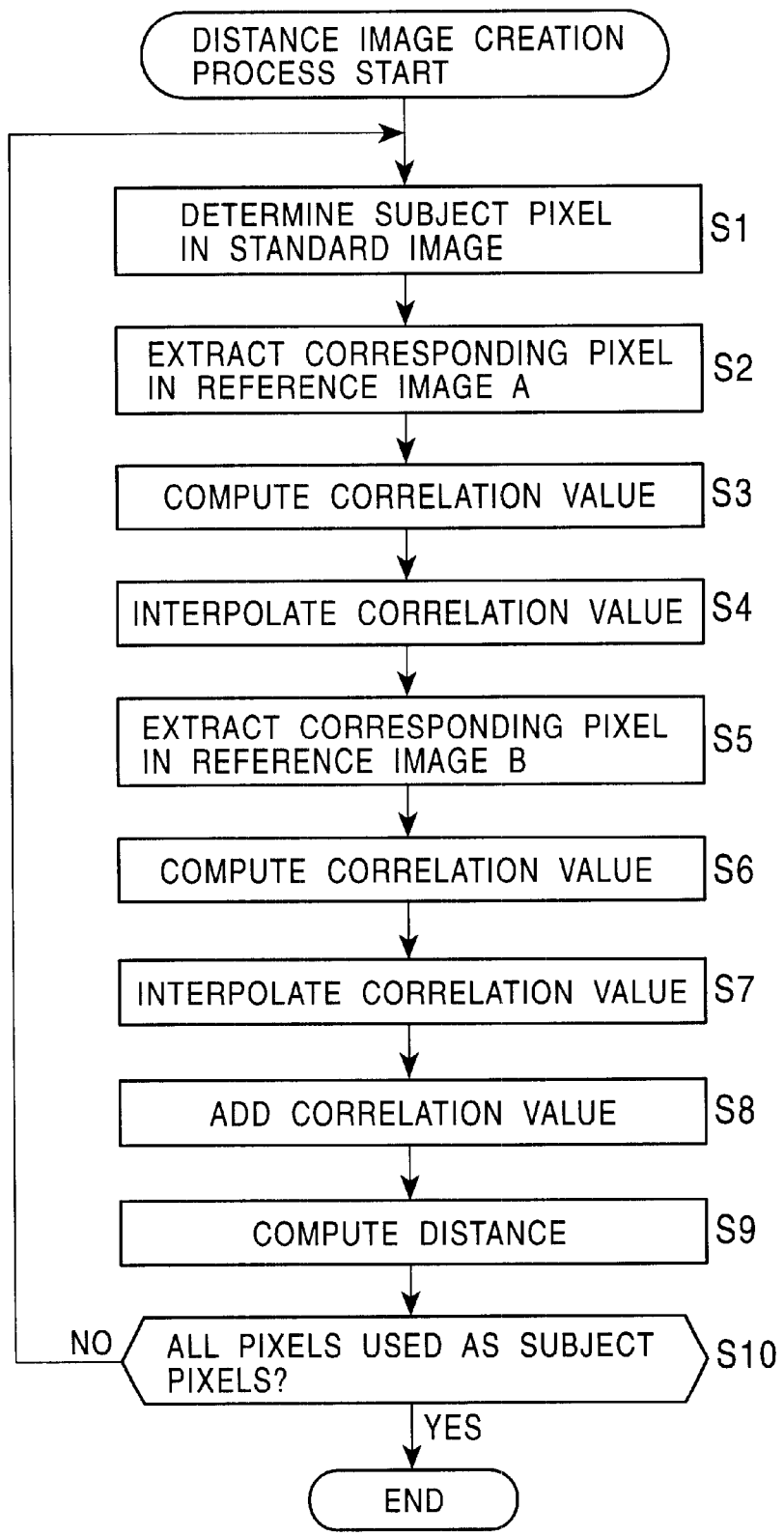
FIG. 13 is a flowchart illustrating the operation of the stereo image distance measurement system.

Next, the operation of the stereo image distance measurement system is described with reference to the flowchart of FIG. 13. The standard image and the reference images A and B of the object 5, whose distance is to be measured, are taken by the standard camera 1 and the reference cameras 2 and 3, and are stored in the corresponding image memories 21 to 23.

In step S1, the corresponding pixel extraction section 24 reads the standard image from the image memory 21 and determines a desired pixel on the standard image as the standard pixel $m_b$. In step S2, the corresponding pixel extraction section 24 reads the reference image A from the image memory 22, and further, reads a projection transformation matrix H corresponding to each of the distances $Z_1, Z_3, \ldots, Z_{n-1}$ from the storage section 25. As shown in FIG. 10, the corresponding pixel extraction section 24 then determines a plurality of reference pixels ($m_{i1}, m_{i3}, \ldots, m_{in-1}$) as candidates for the pixels in the reference image A, corresponding to the standard pixel $m_b$, and outputs the pixel values of the standard pixel $m_b$ and the plurality of reference pixels ($m_{i1}, m_{i3}, \ldots, m_{in-1}$) to the correlation value computation section 26.

In step S3, in a manner as described above, the correlation value computation section 26 computes the mutual correlation values $S_1, S_3, \ldots, S_{n-1}$ (indicated by ▲ marks in FIG. 5) between a predetermined small area with the standard pixel $m_b$ being the center and a similar small area with the reference pixels ($m_{i1}, m_{i3}, \ldots, m_{in-1}$) in the reference image A being the center, as the sum of the squares of the difference of each pixel within the small area. Furthermore, in step S4, the correlation value computation section 26 creates a spline curve by using the computed mutual correlation values $S_1, S_3, \ldots, S_{n-1}$, and interpolates a mutual correlation value $S_{k+1'}$ of the midpoint of two adjacent mutual correlation values $S_k$ and $S_{k+2}$ (k=1, 3, ..., n−3) of the mutual correlation values. That is, the correlation value computation section 26 interpolates the mutual correlation values $S_{2'}, S_{4'}, \ldots, S_{n-2'}$ (indicated by △ marks in FIG. 12) by using the mutual correlation values $S_1, S_3, \ldots, S_{n-1}$.

In step S5, the corresponding pixel extraction section 24 reads the reference image B from the image memory 23, and in step S6, reads a projection transformation matrix H corresponding to each of the distances $Z_2, Z_4, \ldots, Z_n$ from the storage section 25. As shown in FIG. 10, the corresponding pixel extraction section 24 then determines a plurality of reference pixels ($m_{i2}, m_{i4}, \ldots, m_{in}$) as candidates for the pixels in the reference image B, corresponding to the standard pixel $m_b$, and outputs the pixel values thereof to the correlation value computation section 26.

In step S6, in a manner as described above, the correlation value computation section 26 computes the mutual correlation values $S_2, S_4, \ldots, S_n$ (indicated by marks in FIG. 12) between a predetermined small area with the standard pixel $m_b$ being the center, and a similar small area with the reference pixels ($m_{i2}, m_{i4}, \ldots, m_{in}$) in the reference image B being the center, as the sum of the squares of the difference of each pixel within the small area. Furthermore, in step S7, the correlation value computation section 26 creates a spline curve by using the computed mutual correlation values $S_2, S_4, \ldots, S_n$, and interpolates a mutual correlation value $S_{k+1'}$ of the mid-point of two adjacent mutual correlation values $S_k$ and $S_{k+2}$ (k=2, 4, ..., n−2) of the mutual correlation values. That is, the correlation value computation section 26 interpolates the mutual correlation values $S_{3'}, S_{5'}, \ldots, S_{n'}$ (indicated by ○ marks in FIG. 12) by using the mutual correlation values $S_2, S_4, \ldots, S_n$.

In step S8, the correlation value computation section 26 computes the addition value $SS_p = S_p + S_{p'}$ (p=2, 3, ..., n−1, indicated by marks in FIG. 12) of the mutual correlation values $S_2, S_3', S_4, \ldots, S_{n-1'}$ and the mutual correlation values $S_{2'}, S_3, S_{4'}, \ldots, S_{n-1}$, which correspond to each other, and outputs the addition value to the distance computation section 27.

Figure 12:
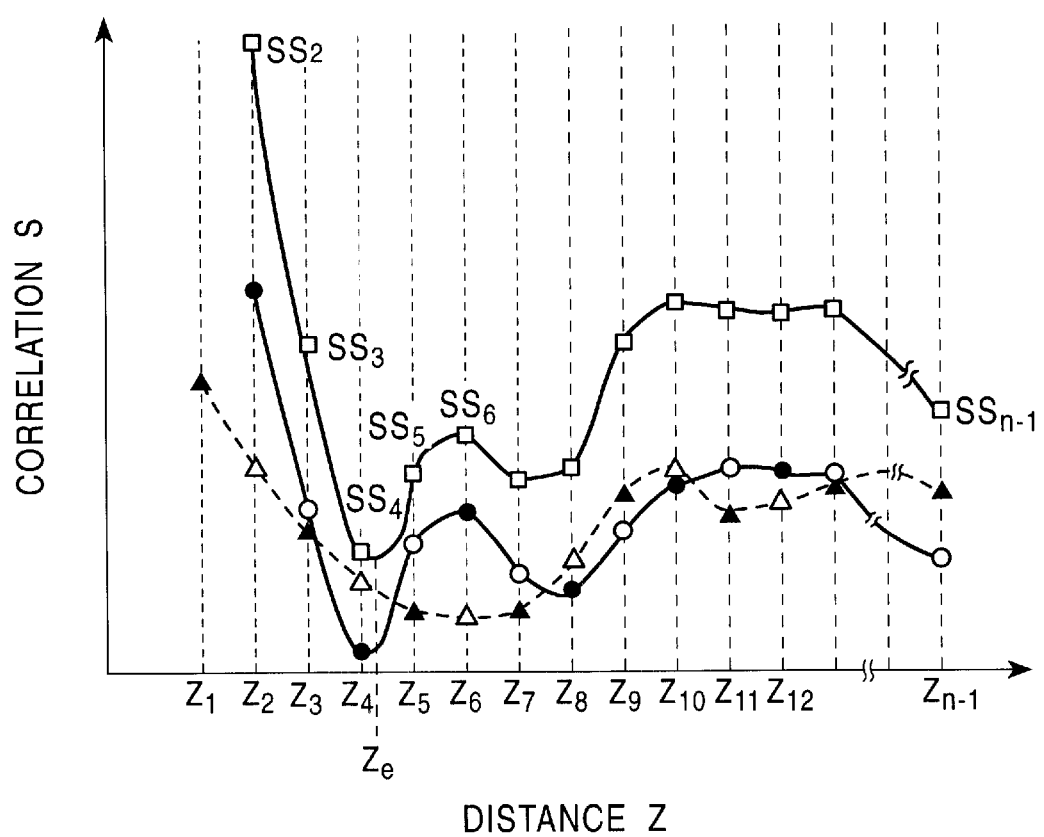
FIG. 12 is an illustration of the process of a distance computation section 27 of FIG. 10.

The distance computation section 27 extracts the point (($Z_4, SS_4$) in the example of FIG. 12) of the smallest value of the addition value $SS_p$ input from the correlation value computation section 26, and extracts the points ($Z_3, SS_3$) and ($Z_5, SS_5$) before and after it, creates a second-order curve passing through the three points, and outputs $Z_e$ corresponding to the smallest value of the second-order curve, as the distance of the standard pixel $m_b$, to the distance image memory 28.

In step S10, the corresponding pixel extraction section 24 determines whether or not all the pixels of the standard image have been used as the standard pixel $m_b$. The process from steps S1 to S10 is repeated until it is determined that all the pixels of the standard image have been used as the standard pixel $m_b$. When it is determined that all the pixels of the standard image have been used as the standard pixel $m_b$, a distance corresponding to the coordinates of the standard pixel stored in the distance image memory 28 is output, as a distance image, to a stage subsequent thereto.

In a manner as described above, in the reference image A, reference pixels ($m_{i1}, m_{i3}, \ldots, m_{in}$) corresponding to the distances $Z_1, Z_3, \ldots, Z_{n-1}$ are extracted, and in the reference image B, reference pixels ($m_{i2}, m_{i4}, \ldots, m_{in}$) corresponding to the distances $Z_2, Z_4, \ldots, Z_n$ are extracted. Consequently, in comparison with the case shown in FIG. 12, the intervals of distances to be assumed can be decreased without increasing the number of computations of the mutual correlation values, which must be performed.

In practice, the above process is performed by the CPU 13 in accordance with control programs recorded in the ROM 15.

In this embodiment, two sets of stereo image pairs are used. In addition, the present invention can be applied to a case in which a larger number of stereo image pairs is used.

Furthermore, in this embodiment, the mutual correlation value is computed as the sum of the squares of the difference of the pixel value. In addition, for example, the sum of the absolute values of the pixel values and the normalized correlation may be computed.

Furthermore, in this embodiment, a spline curve is used to interpolate the mutual correlation values. In addition, for example, the prior and subsequent mutual correlation values may be averaged to interpolate the mutual correlation value of the mid-point.

The computer program for performing each of the above-described processes may be provided to a user via a distribution medium comprising an information recording medium, such as a magnetic disk or a CD-ROM, and via a network distribution medium, such as the Internet or a digital satellite.

As has been described up to this point, according to the stereo image distance measurement system of this embodiment, a plurality of pixels on a first reference image corresponding to a desired pixel on the standard image are extracted in such a manner as to correspond to a first set of distances which are discretely set within a measurement range, and a plurality of pixels on a second reference image corresponding to a desired pixel on the standard image are extracted in such a manner as to correspond to a second set of distances which are discretely set within a measurement range. This makes it possible to measure distances with higher accuracy, without increasing the number of searches which must be performed.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus for measuring a distance to an object by using a plurality of images of the same photographed object, said image processing apparatus comprising:

first extraction means for extracting, from a first reference image, a first candidate pixel which is a candidate for a first corresponding pixel corresponding to a desired pixel on a standard image, for each distance in a first group of distances formed of a plurality of distances which are set discretely in a measurement range;

second extraction means for extracting, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range;

computation means for measuring a similarity between the desired pixel on said standard image and the first candidate pixel on said first reference image, and a similarity between the desired pixel on said standard image and the second candidate pixel on said second reference image; and determination means for determining the distance to said object on the basis of the result computed by said computation means.

2. An image processing apparatus according to claim 1, wherein said computation means computes the similarity corresponding to said second group of distances by interpolating the similarity in said first group of distances and computes the similarity corresponding to said first group of distances by interpolating the similarity in said second group of distances, and said determination means determines the distance to said object on the basis of said similarity.

3. An image processing apparatus according to claim 2, wherein said computation means computes an integrated similarity of the candidate pixels in said first and second reference images from said similarity for each distance in said first and second groups of distances, and said determination means determines the distance to said object on the basis of said integrated similarity.

4. An image processing apparatus according to claim 1, wherein said computation means computes a correlation value of the desired pixel on said standard image and the candidate pixel in said first reference image, and a correlation value of the desired pixel on said standard image and the candidate pixel in said second reference image.

5. An image processing apparatus according to claim 4, wherein said computation means computes a correlation value corresponding to the distance of said second group of distances by interpolating the correlation value in said first group of distances, and computes a correlation value corresponding to the distance of said first group of distances by interpolating the correlation value in said second group of distances, and said determination means determines the distance to said object on the basis of said correlation value.

6. An image processing apparatus according to claim 5, wherein said computation means adds said correlation value for each distance in said first and second groups of distances, and said determination means determines the distance to said object on the basis of said added correlation value.

7. An image processing apparatus according to claim 6, wherein said determination means determines the distance to said object by applying curve approximation to said added correlation value.

8. An image processing apparatus according to claim 7, wherein said determination means creates a second-order curve passing through the smallest value of said added correlation value and two points before and after the smallest value, and determines the distance corresponding to the smallest value of said second-order curve as a distance to said object.

9. An image processing apparatus according to claim 1, wherein each distance included in said second group of distances is a mid-point of two adjacent distances included in said first group of distances.

10. An image processing apparatus according to claim 9, wherein the nearer an object is to said standard camera, the smaller the intervals of distances included in said first and second groups of distances.

11. An image processing apparatus according to claim 9, wherein each distance included in said first and second groups of distances is set to be equal.

12. An image processing method for measuring a distance to an object by using a plurality of images of the same photographed object, said image processing method comprising:

a first extraction step for extracting, from a first reference image, a first candidate pixel which is a candidate for a first corresponding pixel corresponding to a desired pixel on a standard image, for each distance in a first group of distances formed of a plurality of distances which are set discretely in a measurement range;

a second extraction step for extracting, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range;

a computation step for measuring a similarity between the desired pixel on said standard image and the first candidate pixel on said first reference image, and a similarity between the desired pixel on said standard image and the second candidate pixel on said second reference image; and a determination step for determining the distance to said object on the basis of the result computed by said computation means.

13. An image processing method according to claim 12, wherein said computation step computes the similarity corresponding to said second group of distances by interpolating the similarity in said first group of distances and computes the similarity corresponding to said first group of distances by interpolating the similarity in said second group of distances, and said determination step determines the distance to said object on the basis of said similarity.

14. An image processing method according to claim 13, wherein said computation step computes an integrated similarity of the candidate pixels in said first and second reference images from said similarity for each distance in said first and second groups of distances, and said determination step determines the distance to said object on the basis of said integrated similarity.

15. An image processing method according to claim 12, wherein said computation step computes a correlation value of the desired pixel on said standard image and the candidate pixel in said first reference image, and a correlation value of the desired pixel on said standard image and the candidate pixel in said second reference image.

16. An image processing method according to claim 15, wherein said computation step computes a correlation value corresponding to the distance of said second group of distances by interpolating the correlation value in said first group of distances, and computes a correlation value corresponding to the distance of said first group of distances by interpolating the correlation value in said second group of distances, and said determination step determines the distance to said object on the basis of said correlation value.

17. An image processing method according to claim 16, wherein said computation step adds said correlation value for each distance in said first and second groups of distances, and said determination step determines the distance to said object on the basis of said added correlation value.

18. An image processing method according to claim 17, wherein said determination step determines the distance to said object by applying curve approximation to said added correlation value.

19. An image processing method according to claim 18, wherein said determination step creates a second-order curve passing through the smallest value of said added correlation value and two points before and after the smallest value, and determines the distance corresponding to the smallest value of said second-order curve as a distance to said object.

20. An image processing method according to claim 12, wherein each distance included in said second group of distances is a mid-point of two adjacent distances included in said first group of distances.

21. An image processing method according to claim 20, wherein the nearer an object is to said standard camera, the smaller the intervals of distances included in said first and second groups of distances.

22. An image processing method according to claim 20, wherein each distance included in said first and second groups of distances is set to be equal.

23. A medium for providing instructions to an image processing apparatus to execute a process for measuring a distance to an object by using a plurality of images of the same photographed object, said process comprising the steps of:

extracting, from a first reference image, a first candidate pixel which is a candidate for a first corresponding pixel corresponding to a desired pixel on a standard image, for each distance in a first group of distances formed of a plurality of distances which are set discretely in a measurement range;

extracting, from a second reference image, a second candidate pixel which is a candidate for a second corresponding pixel corresponding to a desired pixel on the standard image, for each distance in a second group of distances formed of a plurality of distances, different from those of the first group of distances, which are set discretely in a measurement range;

measuring a similarity between the desired pixel on said standard image and the first candidate pixel on said first reference image, and a similarity between the desired pixel on said standard image and the second candidate pixel on said second reference image; and determining the distance to said object on the basis of the result computed by said computation means.

* * * * *